(No Model.)
J. E. EMERSON.
ATTACHABLE SAW TOOTH.
No. 539,801. Patented May 28, 1895.
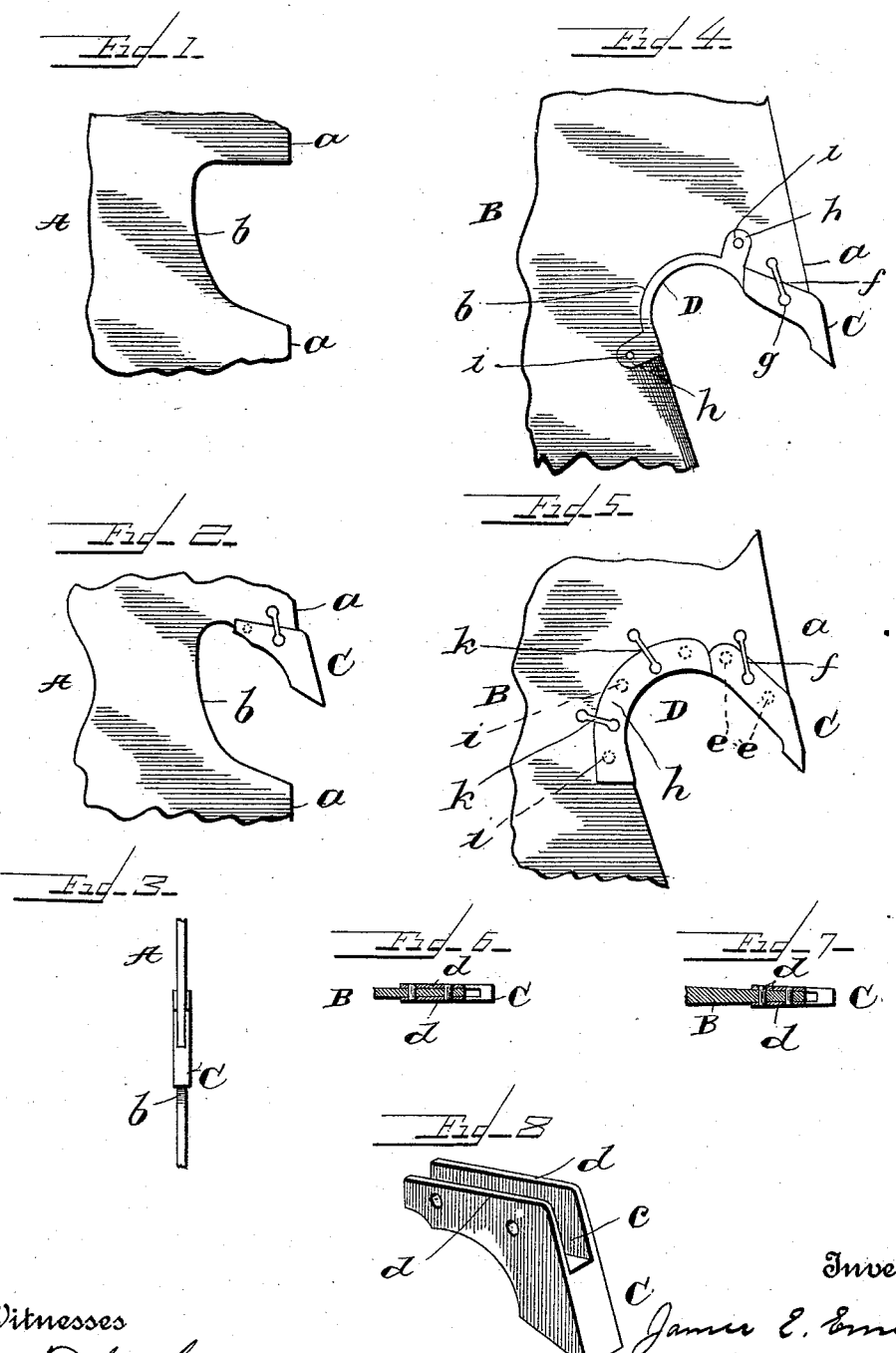

United States Patent Office.

JAMES E. EMERSON, OF BEAVER FALLS, PENNSYLVANIA, ASSIGNOR OF ONE-HALF TO THE E. C. ATKINS & COMPANY, OF INDIANAPOLIS, INDIANA.

ATTACHABLE SAW-TOOTH.

SPECIFICATION forming part of Letters Patent No. 539,801, dated May 28, 1895.

Application filed September 17, 1894. Serial No. 523,275. (No model.)

*To all whom it may concern:*

Be it known that I, JAMES E. EMERSON, a citizen of the United States, residing at Beaver Falls, in the county of Beaver and State of Pennsylvania, have invented certain new and useful Improvements in Attachable Saw-Teeth; and I do hereby declare the following to be a full, clear, and exact description of the invention, such as will enable others skilled in the art to which it appertains to make and use the same.

My present invention relates to saws, such as circular saws, band saws, gang saws, and other similar saws and has for its object the construction of attachable teeth and attachable throat pieces for circular saws and attachable teeth for band and other saws. It is well known in the art to which my invention appertains that saws must be made of a high grade of steel, that in gumming the saws the cutting edge of the saws is stretched and to overcome this effect in circular saws the center of the saws must be hammered to "open up" the saw and in band saws and other straight saws on the cutting teeth the back of the saws must be hammered throughout the length of the saws to stretch the saws on the back equal to the stretch produced on the cutting edge by gumming. This stretching of the saws by gumming and hammering weakens the saws, and in large band saws not more than one third of the width of the saws on an average can be used for the cutting edge by gumming and filing the teeth. Furthermore, in band saws the constant bending of the saws in passing over the pulleys on which they are mounted and the straightening of the saws between the pulleys crystallizes the metal and prevents the use of steel of as high a degree of temper as can be used when the teeth are separate from the saw. The width of band saws varies according to the work required, so that for the largest logs the widest saws must be used, and as a consequence the efficiency of the saw is diminished as the width of the saw is reduced by gumming and filing, so that when a twelve inch saw has been worn down one third it has no more efficiency than a new eight inch saw and can do no more work. In circular saws the attaching of teeth as heretofore practiced has nearly always resulted in springing the cutting edge of the saw which results in cutting an irregular kerf in the timber, and the saw itself has had to be prepared by providing interlocking members to engage with like members on the teeth to be inserted or attached. By my invention no milling or filing of the saw is required and no gumming producing stretching of the cutting edge of the saw is resorted to, and a lower grade of steel such as open hearth steel may be used for the body of the saw, and in band saws teeth of a much higher temper than have heretofore been used can be attached and the permanent teeth require no setting.

The invention will be fully disclosed in the following specification and claims.

In the accompanying drawings, which form part of this specification, Figure 1 represents a plan view of a section of a band-saw; Fig. 2, a like view of the same with a saw-tooth attached; Fig. 3, a transverse section showing a tooth attached to a band-saw; Fig. 4, a plan view of a section of a circular saw with a tooth and a throat-piece attached; Fig. 5, a like view of the same, showing other form of throat-piece; Fig. 6, a section through a tooth and the saw; Fig. 7, a like view showing a modification of the tooth, and Fig. 8 an enlarged detail perspective of a tooth.

Reference being had to the drawings and the letters thereon A indicates a section of a band or other saw having a straight cutting edge; B, a section of a circular saw; C, a saw tooth, and D a throat piece.

The saw of either kind is provided with ordinary teeth $a$ and an ordinary throat $b$ on which no milling or filing of the sides has been done but present plain flat sides.

The tooth C is of a thickness in excess of the thickness of the body of the saw and in its back is formed a groove $c$ of a width equal to the thickness of the body of the saw, the side walls of which groove form flanges $d\ d$ to engage the sides of the saw. The groove $c$ is of sufficient depth to secure the tooth to the saw by rivets $e\ e$ which pass through the flanges and the saw, and prevent the displacement of the tooth.

The tooth may be secured to the saw by a yoke $f$ as shown in Figs. 4 and 5 instead of the rivets. When the yoke is used the flanges $d$ $d$ need not be as deep as required when the rivets are used for the reason the holes $g$ may be formed in the body of the tooth. The groove $c$ may also have tapering walls as shown in Fig. 7 to engage a tapering saw. The throat-piece D is also of a thickness in excess of the thickness of the body of the saw and is provided with side flanges $h$ which may extend the length of the throat as in Fig. 5, or the flanges may be cut away in the center leaving lug like ends as in Fig. 4. In either construction the throat-piece is secured to the saw by rivets $i$ or by yokes $k$, and is slightly thinner than the tooth to allow it to pass through the kerf without choking. The increased thickness of the throat-piece increases its durability without augmenting the depth of the throat-piece.

In the construction described the attachable teeth are of a thickness so much in excess of the thickness of the saw blade that no setting of the permanent teeth is required and the flanges on the attachable teeth covering the joint between said teeth and the permanent teeth protect the latter against wear and by leaving a space between the timber and the permanent teeth they do not heat and expand by frictional contact with the timber.

As heretofore stated, saws using insertible or attachable teeth have required milling or filing the sides of the permanent teeth and as a consequence only circular saws could be provided with them, as the expense attending the milling or filing the sides of the teeth of a band saw fifty feet in length would be so great as to render the use of attachable teeth impracticable from a pecuniary stand point. By my invention new attachable teeth can be supplied at the cost of gumming and hammering the saw and without injury to the saw.

Having thus fully described my invention, what I claim is—

1. An attachable saw tooth whose entire thickness is in excess of the thickness of the body of a saw and provided with a groove in the back of the tooth and with flanges fitting the sides of a plain permanent tooth of a saw.

2. An attachable saw tooth whose entire thickness is in excess of the thickness of the body of the saw and provided with flanges fitting the sides of a plain permanent tooth, in combination with suitable means for securing the tooth to a saw.

3. An attachable saw tooth whose entire thickness is in excess of the thickness of the body of a saw and provided with a groove in its back equal in width to the thickness of the saw and with flanges fitting the sides of a plain permanent tooth of a saw, in combination with an attachable throat-piece whose entire thickness is in excess of the thickness of the saw and provided with flanges to engage the sides of the saw.

In testimony whereof I affix my signature in presence of two witnesses.

JAMES E. EMERSON.

Witnesses:
D. C. REINOHL,
D. W. REINOHL.